United States Patent [19]

Härtel et al.

[11] 4,439,376

[45] Mar. 27, 1984

[54] FLOW PROPORTIONING DEVICE

[75] Inventors: Günter Härtel, Neuss; Armin Schürfeld, Meerbusch, both of Fed. Rep. of Germany

[73] Assignee: Bosch & Pierburg System oHG, Neuss, Fed. Rep. of Germany

[21] Appl. No.: 384,992

[22] Filed: Jun. 4, 1982

[30] Foreign Application Priority Data

Jun. 19, 1981 [DE] Fed. Rep. of Germany ....... 3123983

[51] Int. Cl.[3] .......................... F16K 3/32; F16K 47/04

[52] U.S. Cl. .................................. 261/50 A; 251/208; 138/43; 138/45

[58] Field of Search .................... 251/208; 138/43, 45; 261/50 A

[56] References Cited

U.S. PATENT DOCUMENTS

| | | | |
|---|---|---|---|
| 3,899,879 | 8/1975 | Downing | 251/208 X |
| 3,934,564 | 1/1976 | Barnert | 251/208 X |

*Primary Examiner*—Arnold Rosenthal

*Attorney, Agent, or Firm*—Toren, McGeady and Stanger

[57] ABSTRACT

A proportioning device for controlling fluid flow includes a pair of discs (1 and 6) mounted eccentrically face to face and rotatable about parallel axes. The discs are spring biassed towards each other so that a contact face (7) on disc (6) is in constant contact with a slide face (2) on disc (1) irrespective of the relative angular position of the discs. Disc (1) has a passage (4) for the flow of fluid to an outlet (5) in the slide face (2), and disc (6) has a contoured area (8) around its face (7). The axial spacing of flow outlet (5) from the immediately opposite portion of the contoured area (8) defines the free sectional area which determines the amount of fluid which can flow from the outlet. Contoured area (8) is shaped for varying the rate of flow in a predetermined manner by rotating one or both of the discs. Since rotation of the discs can be controlled independently, the flow of fluid can be controlled in dependence upon at least two different operating parameters. The device is particularly useful in a carburettor to control the supply of fuel mixed with air dependent upon the air throughput (determined by the shape of the contoured area (8)) but which can be modified (by turning the disc (1)) in accordance with one or more parameters related to the operation of the engine.

16 Claims, 4 Drawing Figures

FLOW PROPORTIONING DEVICE

This invention relates to a proportioning device for controlling the flow of a liquid or gaseous medium by varying the free cross-sectional area of a passage through which the fluid flows in dependence upon at least one operating parameter which is related to the demand, and is particularly concerned with such a device which can be used to meter the flow of fuel in a carburetor or fuel injection system.

In proportioning devices of this kind it is known to have a valve in the flow passage which is controlled in dependence upon a selected operating parameter so that a linearly movable slider such as a valve piston varies the flow cross-section of the passage according to its position. Such a proportioning device has the considerable disadvantage that control of the free cross-sectional area of flow is possible only in dependence upon one operating parameter at a time. If proportioning is to be performed in dependence upon a number of operating parameters it is either necessary to combine the various operating parameters into a superimposed control quantity or otherwise employ a number of such proportioning devices which are controlled individually. In many cases, e.g., in the field of fuel metering by carburetor techniques, these measures are too elaborate and possibly also totally unsuitable.

The aim of the invention is to provide a proportioning device of the kind described which has a simple compact construction, is simple and reliable in operation, and, most importantly, enables independent control of the cross-sectional area of flow in accordance with more than one operating parameter.

In solution of this problem, according to the invention a proportioning device for controlling the flow of fluid according to demand by varying the free cross-sectional area of a passage through which the fluid flows comprises a disc-shaped rotary slider which is mounted to rotate about a first axis and which has a planar slide face lying in a plane perpendicular to the first axis and a flow outlet for the fluid opening in the slide face, a contoured disc which is mounted to rotate about a second axis parallel to the first axis and which has a planar contact face lying in a plane perpendicular to the second axis and in abutting contact with the slide face of the rotary slider, the contoured disc also having a relief-like contoured area which surrounds the planar contact face and is spaced axially from the flow outlet to define the free cross-sectional area which determines the flow of fluid from the outlet, the contoured area being shaped so that rotation of the rotary slider and/or the contoured disc varies the axial spacing between the contoured area and the flow outlet and hence varies the free cross-sectional area of flow, and positioning means for rotating the rotary slider and the contoured disc independently of each other.

In operation, the disc-shaped rotary slider and the contoured disc may be turned completely independently of one another in dependence upon two different operating parameters, so that by means of the relief-like contoured area predetermined flow ratios may be achieved in dependence upon the mutual positional relationship of the two discs as determined by the parameters. The mutual abutting contact of the slide face of the rotary slider and the planar contact area of the contoured disc sees to it that there is always a predetermined flow outlet condition. The slider and the disc may be made relatively thin so that they have a low inertia and are therefore rapidly adjustable by their positioning means.

The proportioning device may be used in many ways, and in a simple manner enables very precise control over the free cross-sectional area of flow.

Preferably the slide face of the rotary slider is carried by an outer annular projecting portion on the front of the slider, and the contact face of the contoured disc is carried by a central projecting portion on the front of the disc, the distance between the first and second axes corresponding approximately to the radius of the contoured disc and approximately to the radial distance of the flow outlet in the slide face from the first axis. In this case, because the contact face of the contoured disc is at its centre and the disc is mounted to rotate about a central axis, the disc can be turned particularly easily in comparison with the rotary slider, which has its slide face radially spaced from its rotary axis, and may be turned by positioning means of very low power. If the rotary slider is turned in such a way that the flow outlet in the slide face arrives in the region of the central contact area of the contoured disc, the flow passage may be blocked, but in any other relative angular position of the slider and the contoured disc, a predetermined cross-sectional area of flow is achieved.

Irrespective of the exact nature and position of the two contacting plane frontal areas of the slider and the disc, they are preferably arranged so that the rotary slider and the contoured disc can be rotated to bring the contact face of the disc into alignment with the flow outlet in the slide face and the flow outlet is thereby closed by the contact face. The closure is effected by the flow outlet being completely covered over by the contact face which contacts and seals against the region of the slide face around the flow outlet, and even in the case of the application of a pressure gradient no flow through the outlet is possible.

A particularly preferred use of the device in accordance with the invention is in a constant pressure carburetor to control the flow of fuel from a float chamber for mixture with the air flow through the carburettor, wherein the contoured disc is arranged to rotate together with a pivoted flap air valve of the carburetor or with a member which moves the valve, or is rotated in some other way in correspondence with the throughput of air in the carburetor, and the disc is located in a space connected directly or indirectly to a constant-pressure stage of the carburettor, and wherein the rotary slider is mounted so that its flow outlet communicates upstream with the float chamber and is rotated by electric motor-driven positioning means under the control of an electronic control apparatus. The constant pressure in the carburettor existing at the proportioning device, in combination with the pivoted air valve enables exact association of the throughput of fuel with the throughput of air at the time, which is correct for the demand, because the free cross-sectional area of flow for the fuel is varied in correspondence with the position of the air valve. For this purpose the contoured area of the contoured disc is shaped in at least one annular region such that, with the rotary slider stationary, turning of the contoured disc will vary the spacing between the flow outlet and the contoured area, and hence the cross-sectional area which controls the flow of fuel, in dependence upon the throughput of air. Rotational adjustment of the rotary slider enables a correction of this metering of fuel, which is yet to be explained, by moving the flow outlet opposite a different annular region of the contoured disc. The form of proportioning device in which the contoured disc has its contact face located centrally is particularly suitable in the carburettor since the disc may be turned easily by the air valve without additional means of transmission of motion being necessary. On the other hand, the adjusting forces necessary for adjustment of the rotary slider are not important since an adequately powerful electric-motor-driven positioning member may be used for this purpose.

Preferably, the slide face and the contact face are spring biassed into engagement with eachother, guaranteeing that these faces rest constantly against one another and that there exist constant clearance conditions for any particular angular relationship between the rotary slider and the contoured disc. This is important for exact proportioning of fuel. Furthermore it will ensure that the flow outlet is satisfactorily sealed off upon alignment of the outlet with the plane contact face of the contoured disc. Appropriate setting of the spring biassing force provides adequate pressure contact between the slide face and the contact face while still permitting the discs to turn with respect to one another in a satisfactory manner.

In one practical embodiment of the proportioning device the biassing spring acts to force axially apart two connector parts which are coaxially slidably engaged one within the other and which rotationally connect the rotary slider and its positioning means through a radial driving pin attached to one of the connector parts and engaging with clearance in a driving notch in the other connector part, and a torsion spring which acts on the connector parts in the circumferential direction to bias the driving pin against one boundary of the driving notch in the circumferential direction. Such a construction ensures satisfactory driving of the positioning member even when the connector parts are not exactly aligned with one another. Whilst in one direction of rotation there exists a positive driving connection via the driving pin and the notch, in the other direction of rotation the driving connection is through the torsion spring. The compression spring holds the slide face and the contact face in engagement without play and guarantees adequate contact pressure without manufacturing tolerances, expansion with temperature, etc., exerting a disadvantageous effect upon operation.

Fundamentally the individual sections of area of the contoured disc may have any arbitrary clearance from the rotary slider. In connection with the application of the proportioning device in a carburetor however, it is preferable to arrange the contoured area of the disc so that for a mid-position of the flow outlet an annular region of the contoured area along a mean circumferential line opposite the flow outlet determines the required trend of the mixture ratio between the air and fuel throughputs in the carburetor for the engine running hot, and for positions of the flow outlet on opposite sides of its mid-position annular regions of the contoured area adjoining that along the mean circumferential line provide preset finely corrective positive and negative adjustments of the mixture ratio. Consequently the basic setting of the throughput of fuel in dependence upon the throughput of air may be increased or reduced by appropriate turning of the rotary slider. Corrective adjustments of this kind to the basic setting of the throughput of fuel are necessary, for example, during running-up or operation at altitude, for Lambda regulation, or for transitional enrichment and the like. Furthermore adaptation of the throughput of fuel to different mixtures of fuels may be effected, such as, for example, fuels having a certain percentage content of methanol. Depending upon the circumstances, the rotary slider may for purposes of correction be turned permanently or temporarily out of its basic setting with respect to the contoured disc.

Preferably the adjustments of the mixture ratio differ in dependence upon the throughput of air but are the same in percent in the case of the same degree of deviation of the flow outlet in the annular regions adjoining the mean circumferential line. This means that independently of the position of the contoured disc at the time, a certain turning of the rotary slider always leads to one and the same percentage alteration of the mixture ratio. Particularly simple control of fuel regulation is hereby achieved, since independently of the position of swing of the rotary slider the predetermined dependence of the proportioning of the fuel upon the throughput of air is preserved. Consequently the relief-like contoured area of the contoured disc in annular regions which adjoin one another has different gradients in the circumferential direction. In this way constant enrichment or weakening of the mixture for different engine speeds may be achieved in a simple manner.

In further refinement the contoured area may have at least one further annular region, such as an outer annular region, for adequately increasing the fuel throughput for low-temperature starting and the running-up phase of an engine, and/or for alteration of the mixture ratio in dependence upon other operating parameters. Consequently the rotary slider may, for example, in the case of the presence of low temperatures be turned in such a way that adequate enrichment of the mixture results. With increasing operating temperature the rotary slider will be turned with respect to the contoured disc to move the flow outlet into registry with the annular region for normal operation. The rotary slider may subsequently, for purposes of acceleration or other correction, be adjusted temporarily or even permanently out of this normal operating position by an amount and in a direction dependent on the enrichment or weakening required. In doing so the dependence of the proportioning of fuel upon the throughput of air may be preserved in any operational circumstances.

Depending upon the intended use of the device and the nature and construction of the positioning means for the rotary slider and the contoured disc, the contoured area of the disc may be subdivided in the circumferential and/or radial directions into individual sections each of which may be brought into position to determine the free cross-sectional area of flow by appropriate rotation of the rotary slider and the contoured disc.

Consequently the distribution of areas over the contoured disc may be adapted, in a manner which in practice is optional, to the operational requirements at the time. In the various regions of the contoured disc the relief-like contoured area may be designed totally differently so that through association of the flow outlet with the various regions of the contoured disc, completely different operational dependence may be achieved.

In a further refinement of the proportioning device for a carburettor, the contoured area of the contoured disc may have two distinctly different sections for operation of the carburettor with alternative fuels, and the rotary slider is arranged to move the flow outlet in conjunction with one or other of these sections. When necessary the rotary slider can simply be switched round in order to obtain operational dependence of the proportioning for an alternative fuel, such as methanol, without the contoured disc having to be exchanged.

Preferably at least one of the rotary slider and the contoured disc is rotated by power driven positioning means under the control of an electronic control apparatus in response to at least one operating parameter, and the control apparatus has a position indicator connected to it for indicating the rotational position of whichever of the rotary slider and the contoured disc it controls. In this way the individual operational states of the device may be very exactly achieved and maintained in dependence upon measured and/or introduced operational parameters.

The contoured disc advantageously has its contoured area formed by stamping. This enables the area to be produced very exactly and in practically any sort of form with relatively low outlay. Furthermore the contoured area of the disc is preferably made corrosion-resistant. By this means a long working life and constant accuracy of proportioning is ensured even in the case of proportioning corrosive media.

In a further refinement, the slide face of the rotary slider and the contact face of the contoured disc may be surface-ground and are preferably also corrosion and wear-resistant so that they do not get excessively worn away be aggressive media and by the permanent frictional engagement. For the achievement of adequate maintenance of dimensions and sealing, the contacting faces must be exactly plane. Surface-grinding is advantageous for this purpose and may be effected, for example, by lapping-in with the faces in mutual contact. The lapping process may be carried on continuously or intermittently until the discs are the desired distance apart or the desired resistance to flow is reached.

The proportioning device in accordance with the present invention is versatile and is particularly useful as described for example, in connection with constant-pressure carburetors. It enables proportioning of liquid or gaseous media in a manner which can be varied, if desired, in dependence upon a number of operating parameters in a very simple and precise way, and is reliable in operation.

An example of a proportioning device in accordance with the invention and of its use in a constant-pressure carburetor will now be described with reference to the accompanying drawings, in which.

Figure 1:
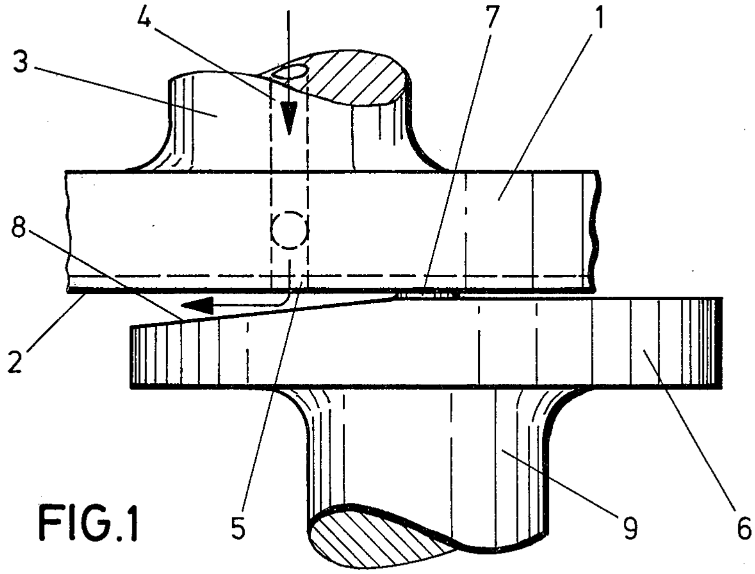
FIG. 1 is a diagrammatic partial side elevation of the proportioning device.
Figure 2:
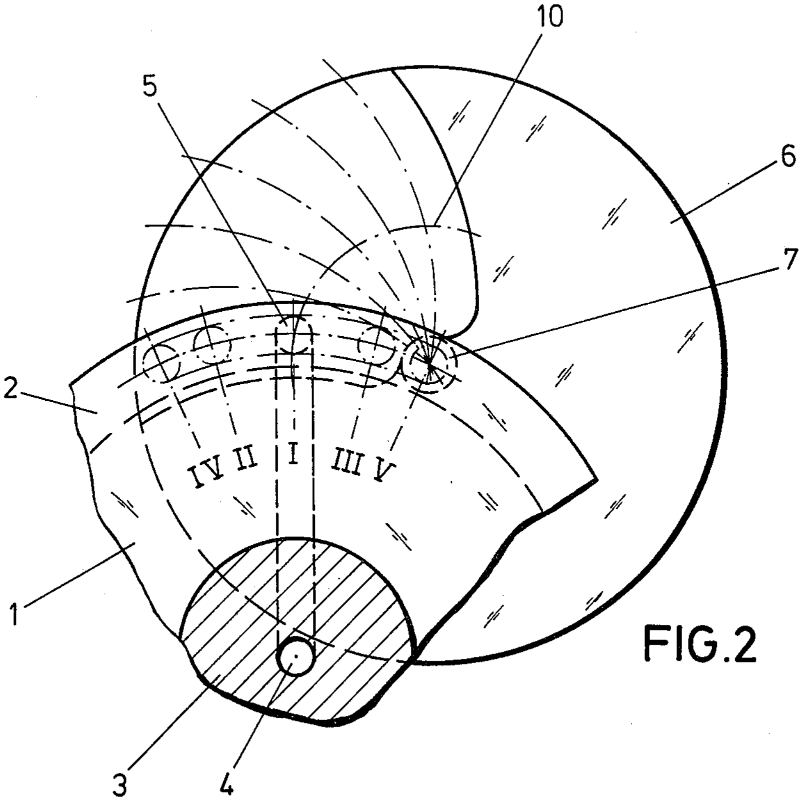
FIG. 2 is a diagrammatic partial plan view of the device.

The device shown in FIGS. 1 and 2 comprises a disc-shaped rotary slider 1 having a planar annular slide face 2 formed by an outer peripheral portion of the free front face of the rotary slider 1. The inner portion of the front face of the slider 1 is recessed so that the surrounding annular slide face 2 stands axially proud thereof. On its rear face the rotary slider 1 is connected to a shaft 3 having a flow channel 4, which in the present case is circular in cross-section, passing axially through it. The channel 4 communicates with a passage which extends radially through the disc-shaped slider 1 and leads to a flow outlet 5 opening in the slide face 2.

In addition the device comprises a contoured disc 6 which is mounted on a shaft 9 and which has its front face, i.e. the face remote from the shaft 9, facing the front face of the rotary slider 1. The front face of the contoured disc 6 has a projecting planar central area 7 which contacts the slide face 2 of the rotary slider 1 and which is surrounded by a relief-like contoured area 8 which is shown only diagrammatically. Different sections of the contoured area 8 have different spacings from the slide face 2 of the rotary slider 1, so that depending upon the association of the flow outlet 5 with the contoured area 8, different free cross-sectional flow areas leading from the flow outlet 5 can be achieved. The relatively over-dimensioned cross-sectional flow area of the flow channel 4 can thereby be throttled more or less severely in a desired manner in the region of the flow outlet 5.

The shafts 3 and 9 of the rotary slider 1 and of the contoured disc 6 are parallel and offset from one another in such a way that in all of the rotational positions of the slider 1 and the disc 6 the planar slide face 2 and the planar central area 7 remain in mutual contact. As may be seen from FIG. 2, rotation of the contoured disc 6 leads to the flow outlet 5 becoming associated with different sections of the contoured area 8 on a certain circumferential line on the contoured area 8. In the position I of the rotary slider 1 this association is with the sections of the area 8 on a mean circumferential line 10, whereas rotation of the rotary slider 1, for example into the positions II, III or IV, moves the association to other circumferential lines on the contoured disc 6. By this means, in the region of the flow outlet 5 practically any free cross-sectional area of flow may be obtained. When the rotary slider 1 is rotated into the position V, the flow outlet 5 is moved into the region of the plane central area 7 of the contoured disc 6, and because of the mutual contact of the central area 7 and the slide face 2, the flow outlet 5 is completely blocked.

Because of the central arrangement of the planar contact area 7 of the contoured disc 6, the latter may be turned by only small adjusting torques or forces. This is important if, for example, the device is to be incorporated in a carburetor and the contoured disc 6 is to be adjusted by an air valve or the like of the carburetor. On the other hand, the offcentre arrangement of the slide face 2 on the rotary slider 1 means that rather larger torques are necessary to turn the slider 1, but these may be applied by a power-driven positioning member or the like. In the position I of the flow outlet 5 of the rotary slider 1 the section of the contoured area 8 of the contoured disc 6 along the mean circumferential line 10 may be arranged in such a way that when used in a constant-pressure carburetor the desired trend of the mixture ratio between the throughput of air and the throughput of fuel is preset for the engine when running hot. The contoured area 8 may be arranged so that by turning the rotary slider 1 from the position I to either of the positions II and III of the flow outlet 5, the alteration of the mixture ratio is relatively small in order to be able to perform fine corrections. Over this range alterations in the mixture ratio may be achieved which differ in dependence upon the throughput of air, but at any position of the contoured disc for a given rotational position of the rotary slider are preferably the same in percentage. It is therefore possible, for example, depending upon temperature or acceleration, to achieve at all throughputs of air fuel enrichments which are of equal magnitude in precent. Over the range between the positions II and IV it is, for example, possible to increase the throughput of fuel so heavily that the amount of fuel proportioned is that necessary for a low-temperature start and the running-up phase of the engine. Upon turning the rotary slider 1 as far as the position V of the flow outlet 5, the latter is completely shut off independently of the throughput of air at the time.

Figure 3:
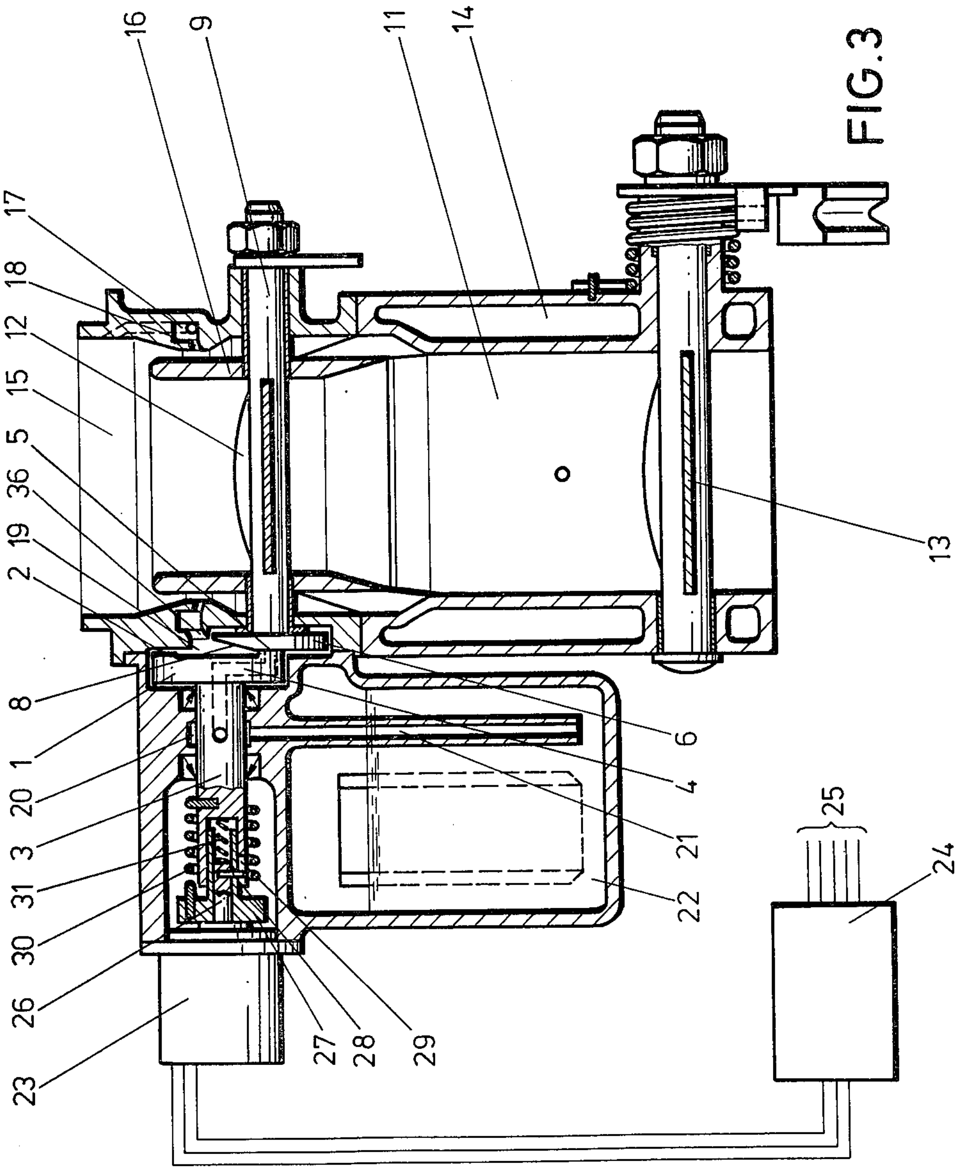
FIG. 3 is a diagrammatic longitudinal section through a down-draught constant-pressure carburetor incorporating the proportioning device of FIGS. 1 and 2; and, FIG. 4 is a diagrammatic side elevation partly in section, of the carburetor shown in FIG. 3 turned through 90°.
Figure 4:
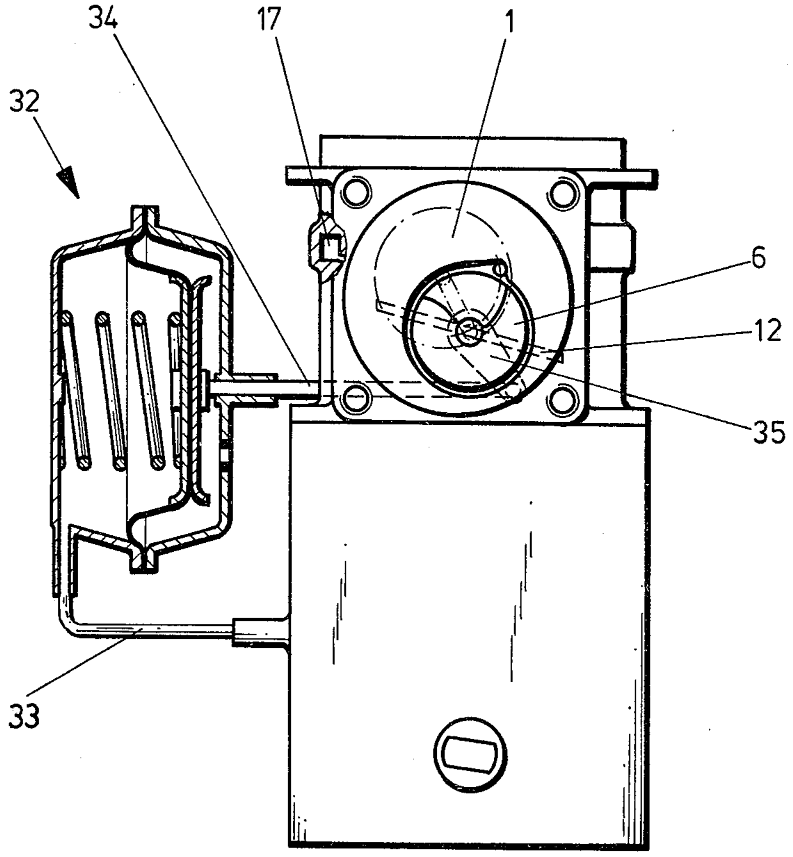

In FIGS. 3 and 4 there is illustrated the use of the proportioning device in accordance with the invention in a special down-draught constant-pressure carburetor, but it should be understood that this is by way of example only since there are numerous further applications of the device for porportioning liquid or gaseous media.

The down-draught constant-pressure carburetor of FIGS. 3 and 4 has a mixing chamber 11 which is bounded upstream by a pivoted flap air valve 12 and downstream by a pivoted flap main throttle valve 13. The main throttle valve 13 is arranged to be adjusted deliberately via mechanical means in a known manner, whereas the air valve 12 is arranged to be adjusted automatically, also in a known manner, in dependence upon the reduced pressure at the time in the mixing chamber 11, in such a way that a reduced pressure is set which is essentially constant.

The mixing chamber 11 is surrounded by a wall 14 which in the present case is double-walled so that it may be heated by the engine cooling water or exhaust gas in order to achieve a more favourable preparation of the mixture by evaporation of the fuel against the inside surface of the wall.

In the inlet 15 to the carburetor there is an insert tube 16 inside which is arranged the pivoted air valve 12. The air vortex originating from the air valve 12 may thereby be weakened inside the insert tube 16 before the air flow which is being sucked in arrives in the actual mixing chamber 11. Between the tubular wall of the carburetor and the insert tube 16 lies an annular by-pass passage which connects the carburetor inlet 15 to the mixing chamber 11. The fuel feed system of the carburetor includes an annular chamber 17 which extends round the by-pass passage and opens via inlet ports 18 into the by-pass passage outside the insert tube 16. The arrangement is such that in the region of the inlet ports 18 reduced pressure conditions prevail which are approximately those existing in the mixing chamber 11, and the fuel feed is effected into the by-pass passage in such a way that a wall film of fuel results, which is as complete as possible and evaporates at least in the region of the hot wall 14.

The proportioning device in accordance with the invention forms part of the fuel feed system and, as may be seen from FIG. 3, the rotary slider 1 and the contoured disc 6 are located in a space 19 which is connected to the annular chamber 17 by a port 36. The shaft 9 of the contoured disc 6 is connected to the air valve 12 so that they rotate together, and the shaft 3 of the rotary slider 1 is connected to an electric-motor-driven positioning member 23 in a manner which will be described later. The flow channel 4 which leads to the flow outlet 5 of the rotary slider 1 communicates with an annular channel 20 which surrounds the shaft 3 and is connected to a dip tube 21 which extends down into the fuel contained in a float chamber 22.

Since the space 19 is connected via the port 36 to the annular chamber 17, the reduced pressure in the mixing chamber 11 can extend via the more or less severely throttled flow outlet 5 as far as the float chamber 22. Consequently, suction of fuel is effected into the by-pass passage surrounding the insert tube 16 in an amount which is predetermined by the mutual position of the contoured disc 6 and the rotary slider 1. With increasing opening of the air valve 12 the throttling of the fuel flow in the region of the flow outlet 5 is reduced so that more fuel can be sucked in. If an enriching or weakening correction of the fuel proportioning is required, the rotary slider 1 is rotated via the shaft 3 in such a way that the throttling of the flow in the region of the flow outlet 5 reduced or increased respectively. If desired, the annular chamber 17 may also be served by an air duct which is connected to the carburetor inlet 15, in order to improve the conditions for distribution and conveyance of the mixture.

As indicated in FIG. 3 the shaft 3 of the rotary slider 1 is driven by means of the electric-motor-driven positioning member 23, which is energized via an electronic control device 24. The device 24 is arranged to receive a number of measured and/or introduced operating parameters via inputs 25 and to process these parameters to produce corresponding adjustment of the rotary slider 1 and thereby achieve a suitable throughput of fuel. A further signal may be fed to the device 24 from a position indicator which is not shown but which senses the operating position of the rotary slider 1. This feedback of the actual position is made use of in a position regulator for energizing the electric-motor-driven positioning member until the actual position agrees with the desired position. In this way the desired operating states may be very exactly reached and maintained, that is, independently of the frictional conditions between the contacting slide face 2 of the slider 1 and the central area 7 of the disc 6.

In the present case the electric-motor-driven positioning member 23 has a driven stub shaft 26 upon which a spring plate 27 is arranged so as to turn with the shaft 26. The spring plate 27 has an axial projection which engages in a central recess in the end of the shaft 3 of the rotary slider 1. A driving-pin 28 connected to the stub shaft 26 (or alternatively the spring plate 27) engages in a driving-notch 29 in the shaft 3 with both axial and circumferential clearance. An outer torsion spring 30 stressed between the spring plate 27 and the shaft 3 twists the shaft 3 with respect to the spring plate 27 in such a way that the driving-pin 28 is biassed into contact with one of the faces of the driving-notch 29 in the circumferential direction. As a result there is a positive driving connection in one direction of rotation, whilst in the other direction the driving connection is through the spring. An inner preloading spring 31 is arranged to force the shaft 3 and the stub shaft 26 apart in the axial direction so that the annular slide face 2 of the rotary slider 1 is biassed into springy pressure contact against the plane central area 7 of the contoured disc 6. This arrangement guarantees a satisfactory rotary driving engagement between the electric-motor-driven positioning member 23 and the rotary slider 1, even when there is not exact axial and/or angular alignment. Furthermore, manufacturing tolerances and variations caused by temperature and the like are compensated.

The adjustment of the air valve 12 is effected in a known manner by means of a vacuum capsule 32. A control pressure space lying on one side of a membrane in the vacuum capsule 32 is connected via a pipe 33 to the mixing chamber 11, and the reduced pressure in the chamber 11 acts upon the membrane against the action of a loading spring to move the membrane, and hence the air valve 12 which is connected to it via a rod 34 and a hinged lever 35, so as to maintain the reduced pressure in the mixing chamber 11 constant, as is well known in the field of constant-pressure carburetors.

The proportioning device in accordance with the invention may be used wherever a variable proportioning of a liquid or gaseous medium in dependence upon a number of operating parameters is desired. The independent rotation of the rotary slider and the contoured disc means that at least two operating parameters may be taken into consideration. The fluid medium may be forced or sucked through the flow outlet of the rotary slider, and normally the total pressure or differential pressure which is responsible for the flow of the fluid is kept constant. However, it is of course possible to vary this pressure also in dependence upon an operating parameter, so that a further variable exists for the proportioning of the fluid medium.

The construction as well as the subdivision of the relief-like contoured area 8 of the contoured disc 6 may be designed in any suitable way which is adapted to its operational requirements. Also, with respect to the shape and arrangement of the plane sliding contact areas 2 and 7, the invention is not restricted to their form in the embodiment illustrated. For example, it would be possible to construct the whole front face of the rotary slider 1 as a plane slide face 2, in which case what is important is that the slide face 2 shall, in any operating position, lie in definite face to face abutting contact with the planar contact area 7 of the disc 6. Also, the contact area 7 does not necessarily have to be arranged at the centre of the contoured disc 6. It may, for example, also be made annular, extending concentrically round the centre.

Furthermore, when the device is used in a carburettor, the contoured disc 6 need not be adjusted directly by the shaft of the air valve 12. It may, for example be adjusted by a power driven positioning member in dependence upon at least one operating parameter, such as the throughput of air as measured by a device working as an air flow meter having a hot wire lying in the air flow or by a pressure sensor detecting the difference in pressure across the air valve 12 and acting in conjunction with a regulating circuit for producing a constant pressure difference. Alternatively the contoured disc 6 may be adjusted manually through a mechanical, pneumatic or electromechanical device, or it may even be adjusted by a device having an expansion member, e.g. in the engine cooling water, if necessary in combination with a pneumatic positioning member responsive to the induction pressure. The contoured disc 6 may instead by coupled to a stepped disc (K-Jetronic) or some other member dependent upon the throughput of air.

In order that a definite throughput of fluid may be guaranteed at a given position of the disc 6, the relief-like contoured surface 8 of the contoured disc 6 must be of very exact dimensions. For this reason, and for reasons of simple and cheap production, it is advantageous to stamp the contoured area. It should preferably be corrosion-resistant in order to enable the proportioning of corrosive media. Mechanical resistance to wear is generally not necessary, except in the region of the planar contact area 7 resting against the slide face 2. In order to guarantee an exact basic setting or calibration of the proportioning device it may be advantageous to provide the projecting planar contact areas 2 and 7 first of all with an axial over-dimension and then, if necessary by mutual contact, to lap them intermittently or continuously down to the final dimension.

The proportioning device in accordance with the invention provides simply and cheaply an extremely comprehensively adaptable means of proportioning a liquid or gaseous medium. Since the rotary discs of the device may be made with a very low inertia, the desired operational states may be achieved rapidly and without significant expenditure of power. Since at least one of the discs, in the present case the contoured disc 6, needs only very small adjusting forces or torques, the proportioning device may be used where only relatively weak positioning members exist but nevertheless great accuracy of adjustment is desired.

In combination with a carburetor, the proportioning device in accordance with the invention can be used to provide exact proportioning of the fuel in dependence upon the throughput of air, in a manner which may be freely chosen, and to adjust the mixture ratio in dependence upon various parameters, e.g. engine temperature, the air and fuel temperature the air pressure, the mixing chamber pressure, a Lambda-1 signal, an irregular-running signal, an intermittent operation such as acceleration, the engine r.p.m. and the like, or in dependence upon a combination of a number of parameters which may be freely chosen. The dependence upon the parameters may be so chosen that on the one hand a wide range is achieved for the adjustment of the mixture ratio and on the other hand there is a high resolution or accuracy in the proportioning of fuel over the range of the mixture ratio for the engine when running hot.

We claim:

1. A proportioning device for controlling the flow of a fluid according to demand, said device comprising a disc shaped rotary slider mounted to rotate about a first axis, a planar slide face on said rotary slider and lying in a plane perpendicular to said first axis, a passage through said rotary slider for carrying the fluid flow to be controlled and terminating in a flow outlet in said slide face, a contoured disc mounted to rotate about a second axis parallel to said first axis, a planar contact face on said contoured disc and lying in a plane perpendicular to said second axis, said contact face being in abutting contact with said slide face, a relief-like contoured area on said contoured disc around said contact face and spaced axially from said flow outlet to define a free cross-sectional area which determines the flow of fluid from said outlet, said contoured area being shaped whereby rotation of either of said rotary slider and said contoured disc may vary the axial spacing between said contoured area and said flow outlet and hence vary said free cross-sectional area of flow, and positioning means for rotating said rotary slider and said contoured disc independently of each other.

2. A device as claimed in claim 1, wherein said rotary slider has an outer annular projecting portion on the front thereof and said slide face is carried by said annular projecting portion, and said contoured disc has a central projecting portion on the front thereof and carrying said contact face, the distance between said first and second axes corresponding approximately to the radius of said contoured disc and approximately to the radial distance of said flow outlet of said slide face from said first axis.

3. A device as claimed in claim 1, wherein said rotary slider and said contoured disc can be rotated to bring said contact face of said disc into alignment with said flow outlet of said slide face to close said outlet.

4. A device as claimed in claim 1, including spring biassing means acting to hold said slide face and said contact face in abutting contact with eachother.

5. A device as claimed in claim 4, including two connector parts which are coaxially slidably engaged one within the other and which are connected one to said rotary slider and the other to said positioning means for rotating said rotary slider, a radial driving pin attached to one of said connector parts, a driving notch in the other of said connector parts and receiving with clearance said radial driving pin, and a torsion spring acting on said connector parts in the circumferential direction to urge said driving pin against one boundary of said driving notch in the circumferential direction, whereby said rotary slider is rotationally connected to said positioning means, and said spring biassing means acting to force said two connector parts axially apart.

6. A device as claimed in claim 1, wherein said contoured area of said contoured disc is subdivided in at least one of the circumferential and radial directions into individual sections each of which may be brought into position opposite said flow outlet to determine said free cross-sectional area of flow by appropriate rotation of said rotary slider and said contoured disc.

7. A device as claimed in claim 1, wherein said contoured area of said contoured disc is stamped.

8. A device as claimed in claim 1, wherein said contoured area of said contoured disc is corrosion-resistant.

9. A device as claimed in claim 1, wherein said slide face on said rotary slider and said contact face of said contoured disc are surface ground and are corrosion and wear resistant.

10. A device as claimed in claim 1, including powered drive means for said positioning means of at least one of said rotary slider and said contoured disc, electronic control apparatus for controlling said power drive means in response to at least one operating parameter, and a position indicator connected to said control apparatus for indicating the rotational position of whichever of the rotary slider and the contoured disc is controlled thereby.

11. A device as claimed in claim 1, in combination with a constant-pressure carburetor to control the flow of fuel from a float chamber of said carburetor for mixture with the air flow through a constant-pressure stage of said carburetor, said carburetor having a space in which said contoured disc is located, means communicating said space with said constant-pressure stage of said carburetor, and means which communicates said flow passage of said rotary slider with said float chamber whereby fuel can flow from said float chamber to said flow outlet in said slide face of said rotary slider, said positioning means for said contoured disc being connected to rotate said disc in correspondence with the throughput of air in said carburetor, and said positioning means for said rotary slider comprising an electric-motor driven member and electronic control apparatus therefor.

12. A device as claimed in claim 11, wherein said carburettor includes a pivoted flap air valve for controlling the throughput of air, and said positioning means of said contoured disc is connected to rotate with said air valve.

13. A device as claimed in claim 11, wherein said contoured area of said contoured disc has an annular region extending along a mean circumferential line and shaped to determine the required trend of the mixture ratio between the air and fuel throughputs in said carburettor for the engine running hot, and first and second additional annular regions on opposite sides of said mean annular region for providing preset finely corrective positive and negative adjustments of said mixture ratio respectively when said rotary slider is turned to move said flow outlet from opposite said mean annular region to opposite one of said first and second additional annular regions.

14. A device as claimed in claim 13, wherein said adjustments of said mixture ratio differ in dependence upon the throughput of air but are the same in percent in the case of the same degree of deviation of said flow outlet in said first and second additional annular regions adjoining said mean annular region.

15. A device as claimed in claim 13, wherein said contoured area has at least one further annular region for adequately increasing said fuel throughput for low temperature starting and the running-up phase of the engine, or for alteration of said mixture ratio in dependence upon other operating parameters.

16. A device as claimed in claim 11, wherein said contoured area of said contoured disc has two distinctly different sections for operation of said carburetor with alternative fuels, said rotary slider being adaptable to move said flow outlet in conjunction with either of said two different sections.

* * * * *